United States Patent
Gundersen et al.

(10) Patent No.: US 7,540,051 B2
(45) Date of Patent: Jun. 2, 2009

(54) MAPPING WEB SITES BASED ON SIGNIFICANCE OF CONTACT AND CATEGORY

(75) Inventors: Matthew A. Gundersen, American Fork, UT (US); Stephen C. Hixson, American Fork, UT (US)

(73) Assignee: Spatial Systems, Inc., American Fork, UT (US)

( * ) Notice: Subject to any disclaimer, the term of this patent is extended or adjusted under 35 U.S.C. 154(b) by 389 days.

(21) Appl. No.: 11/206,630

(22) Filed: Aug. 18, 2005

(65) Prior Publication Data

US 2006/0041549 A1  Feb. 23, 2006

Related U.S. Application Data

(60) Provisional application No. 60/603,477, filed on Aug. 20, 2004.

(51) Int. Cl.
 *G06F 17/30* (2006.01)
(52) U.S. Cl. ............... 7/5; 707/1; 707/2; 707/104.1; 715/273; 715/738
(58) Field of Classification Search ............... None
See application file for complete search history.

(56) References Cited

U.S. PATENT DOCUMENTS

| | | | |
|---|---|---|---|
| 5,496,071 A * | 3/1996 | Walsh | 283/70 |
| 5,963,922 A | 10/1999 | Helmering | |
| 5,966,126 A | 10/1999 | Szabo | |
| 6,032,162 A | 2/2000 | Burke | |
| 6,100,829 A | 8/2000 | Fredrickson et al. | |
| 6,212,522 B1 | 4/2001 | Himmel et al. | |
| 6,260,192 B1 | 7/2001 | Rosin et al. | |
| 6,271,840 B1 | 8/2001 | Finseth et al. | |
| 6,326,962 B1 | 12/2001 | Szabo | |
| 6,356,908 B1 * | 3/2002 | Brown et al. | 707/10 |
| 6,415,319 B1 | 7/2002 | Ambroziak | |
| 6,493,702 B1 | 12/2002 | Adar et al. | |
| 6,519,571 B1 | 2/2003 | Guheen et al. | |
| 6,636,854 B2 | 10/2003 | Dutta et al. | |

(Continued)

OTHER PUBLICATIONS

Social Intelligence Design for the Web Toyoaki Nishida, 2002 IEEE November.

(Continued)

*Primary Examiner*—Don Wong
*Assistant Examiner*—Andalib F Lodhi
(74) *Attorney, Agent, or Firm*—Workman Nydegger

(57) ABSTRACT

The present invention extends to methods, systems, and computer program products for mapping Web sites based on significance of contact and category. A Web browser's contact with one or more Web sites is detected. A portion of content is gathered from each of the contacted Web sites. A weight and/or category is assigned to each Web site. Weight is assigned based on the significance of the Web browser's contact with the Web site. Category is assigned by comparison of Web site key words to a hierarchical category database. Navigable elements including the gathered portions of content displayed in a map. The size of navigable items is varied based on the weight associated with a Web site. Navigable items are placed within category boundaries to indicate that a Web site is assigned to a category. A search module is configured to search weighted/categorized Web sites based on user profiles.

26 Claims, 8 Drawing Sheets

U.S. PATENT DOCUMENTS

| | | | |
|---|---|---|---|
| 6,643,641 B1 | 11/2003 | Snyder | |
| 6,701,318 B2 | 3/2004 | Fox et al. | |
| 6,725,227 B1 | 4/2004 | Li | |
| 6,734,886 B1 | 5/2004 | Hagan et al. | |
| 6,772,139 B1* | 8/2004 | Smith, III | 707/3 |
| 6,829,606 B2 | 12/2004 | Ripley | 707/5 |
| 6,832,218 B1 | 12/2004 | Emens et al. | |
| 6,834,277 B1 | 12/2004 | Learmonth | |
| 6,836,768 B1 | 12/2004 | Hirsch | |
| 6,873,982 B1 | 3/2005 | Bates et al. | |
| 6,915,297 B2 | 7/2005 | Chou | |
| 7,054,870 B2* | 5/2006 | Holbrook | 707/10 |
| 7,269,643 B2* | 9/2007 | Spaid | 709/223 |
| 7,278,092 B2* | 10/2007 | Krzanowski | 715/205 |
| 2002/0059334 A1* | 5/2002 | Jelbert | 707/500 |
| 2002/0078045 A1* | 6/2002 | Dutta | 707/7 |
| 2003/0231216 A1* | 12/2003 | McBrearty et al. | 345/855 |
| 2004/0003351 A1* | 1/2004 | Sommerer et al. | 715/517 |

OTHER PUBLICATIONS

In Search of the Wisdom Web Ning Zhong, Jiming Liu and Yiyu Yao 2002 IEEE November p. 27 to 30.

* cited by examiner

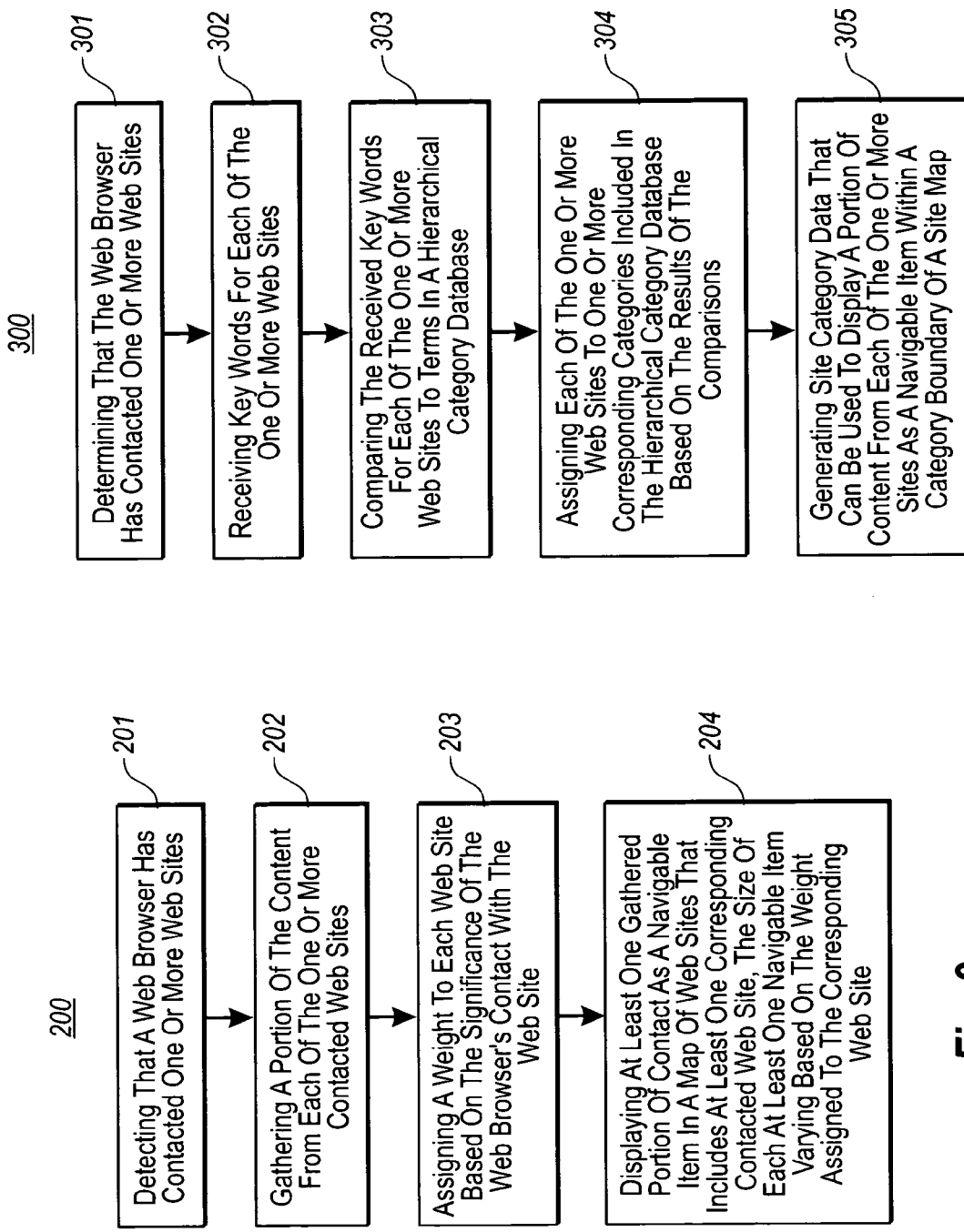

MAPPING WEB SITES BASED ON SIGNIFICANCE OF CONTACT AND CATEGORY

CROSS-REFERENCE TO RELATED APPLICATIONS

This application claims the benefit of U.S. Provisional Application No. 60/603,477, filed Aug. 20, 2004, and entitled Method and Process For Web Navigation, which is incorporated herein by reference in its entirety.

BACKGROUND OF THE INVENTION

1. The Field of the Invention

The present invention relates generally to Web browsing. More specifically, the present invention relates to mapping Web sites based significance of contact and category.

2. The Related Technology

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, transaction processing, Web browsing, and printing documents) include the exchange of electronic messages between a number of computer systems and/or other electronic devices via wired and/or wireless computer networks.

The World Wide Web in particular makes vast amounts of information available to anyone with Internet access. A user connects to the Internet (e.g., thorough an Internet Service Provider) and can then browse context at literally millions of Web sites using a Web browser. To access a Web site, a user can enter a corresponding Uniform Resource Locator ("URL") for the Web site into the Web browser. A URL is a string of characters representing an electronic address of a computer system and a portion of Web based context residing at the computer system. Since URLs are processed by computers the specificity of a user-entered URL must be exact. A discrepancy of even one character in an entered URL can cause a Web browser to access an incorrect Web site or report an error (e.g., 404 not found).

Thus, when a user does not know a correct URL for a Web site, the use can enter search terms into a search engine to attempt to find the Web site. If the search engine locates the Web site, the search engine can provide a HyperText Markup Language ("HTML") link (presented at the Web browser) to the Web site. The user can then select the HTML link to access the Web site.

Search engines are also useful for identifying Web sites related to a specified subject, for example, when a user has no prior knowledge of such Web sites. For example, a user can enter the search term "cars" to locate Web sites related to cars. The search engine can provide HTML links to identified car related Web sites. The user can then select HTML links to access any of the identified car related Web sites.

Typically, Web sites also include links to other (potentially related) Web sites. For example, a car related Web site may contain HTML links to mechanics, auto parts stores, etc. related Web sites. Users can select these include links to access content at the other Web sites (which may contain additional HTML links to further related or non-related content). Thus, a user can follow some number of HTML links before reaching a Web site that has content they find relevant, helpful and/or useful. After accessing relevant, helpful and/or useful content, a user will typically eventually close their Web browser thereby terminating the connection to the Web site and the content.

At some later time, the user may desire to access the same content again. However, the user typically has no way to retrieve the series of links that were accessed when previously reaching the Web site containing the content. Thus, a user will typically re-enter the same search terms (e.g., "cars") into a search engine and attempt to retrace their steps across HTML links to different Web sites until the content is reached.

Browsers typically include some mechanisms to assist a user in locating previously accessed content. For example, most browsers include a history file that stores URLs for previously accessed Web sites. As users access Web sites, the Web browser stores URLs for the Web sites in the history file. To find a URL for a previously accessed Web site, a user can review the history file (typically presented as a textual list) to attempt to identify the URL. This allows a user to review only those previously accessed URLs to identifying a previously access Web site. Relative to re-entering search terms and accessing various HTML links to retrace their steps, reviewing URLs from a history file may save a user some amount of time when trying to re-access content of the World Wide Web.

Most browsers also include auto-complete mechanisms that attempt to guess a complete URL from a partially entered portion of a URL (e.g., through text or character matching). Thus, as a user enters portions of a URL into a Web browse, the Web browser can attempt to match the entered portions to a URL in a history file. Accordingly, the combination of history files and auto-complete mechanisms can further reduce, at least somewhat, the effort required to re-access content on the World Wide Web.

Browsers typically also include mechanisms that allow user to store URLs in a list of frequently visited sites (often referred to as a "favorites list"). A favorites list is more concise than a history file, since a user selects the URLs that will be included a favorites list (as opposed to Web browser automatically including URLs in a history file). Subsequent to accessing a Web site, a user can select a user-interface control that causes a URL for the Web to be stored in a favorites list. Some Web browsers also allow a user to enter a textual description of the Web site associated with the URL. When the user desires to re-access the Web site again, the user can access the favorites list (typically a textual drop down menu) and select the URL for the Web site from the favorites list.

However, since URLs are textual and often provide no indication of the actual content at a represented Web site (some URLs are simply an Internet Protocol ("IP") address), a user is typically required to recall what content corresponds to a specified URL. As the number of URLs added to a history file and/or favorites list increases, it can become more difficult, and eventually impossible, for a user to recall what content corresponds to each URL. Textual descriptions in a favorites list can assist a user in recalling the content associated with a specified URL. Unfortunately, use of textual descriptions require a user to establish and updated the textual descriptions as new Web sites are added to a favorites lists and/or content at a Web site changes. Many users lack the time and effort required to maintain textual descriptions for a favorites list.

Thus, information provided in history files and favorites lists is typically limited to URLs and user-maintained textual descriptions. That is, aside from a URL and possibly some accompanying textual description of the URL, history files and favorites provide limited, if any, information that is helpful to a user in re-accessing a Web site. When a user desires to re-access Web sites that are not included in a favorites list, textual descriptions, even if properly maintained, provide little, if any, benefit to the user. Accordingly, users are typically required to rely heavily on their memory when attempting to re-access a Web site. As a result, re-accessing Web sites on the World Wide Web can be time consuming and burdensome to users.

BRIEF SUMMARY OF THE INVENTION

The foregoing problems with the prior state of the art are overcome by the principles of the present invention, which are directed towards methods, systems, and computer program products for mapping Web sites based on significance of contact and category. In some embodiments, a computer system detects that the Web browser has contacted one or more Web sites. The computer system gathers a portion of content from each of the one or more contacted Web sites. The computer system assigns a weight to each Web site based on the significance of the Web browser's contact with the Web site. The computer system displays at least one gathered portion of content as a navigable item in a map of Web sites that includes at least one corresponding contacted Web site. The size of each at least one navigable item is varied based on the weight assigned to the corresponding Web site.

In other embodiments, a computer system determines that the Web browser has contacted one or more Web sites. The computer system receives key words for each of the one or more Web sites. The computer system compares the received key words for each of the one or more Websites to terms in a hierarchical category database. The computer system assigns each of the one or more Web sites to one or more corresponding categories included in the hierarchical category database based on the results of the comparison. The computer system generates site category data that can be used to display a portion of content from each of the one or more sites as a navigable item within a category boundary of a site map.

In further embodiments, a computer system identifies relevant search results in response to a search request. The computer system receives one or more search terms from a Web browser. The computer system compares the search terms to a plurality of weighted and categorized Web sites. The computer system identifies that one or more Web sites from among the plurality of weighted and categorized Web sites match the search terms based on the comparisons. The one or more identified Web sites being ordered for relevancy based on the weight and category of each of the one or more identified Web sites. The computer system accesses a user profile containing previous browsing activity for the Web browser. The computer system adjusts the relevancy of at least one of the one or more identified Web sites based on the previous browsing activity. The computer system returns the identified one or more Web sites to the browser in an altered order corresponding to the adjusted relevancy of any identified Web site.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 illustrates an example flow chart of a method for mapping Web sites based on the significance of contact with the Web sites.

FIG. 3 illustrates an example flow chart of a method for mapping Web sites based on the category of the Web sites.

DETAILED DESCRIPTION OF THE PREFERRED EMBODIMENTS

Figure 1:
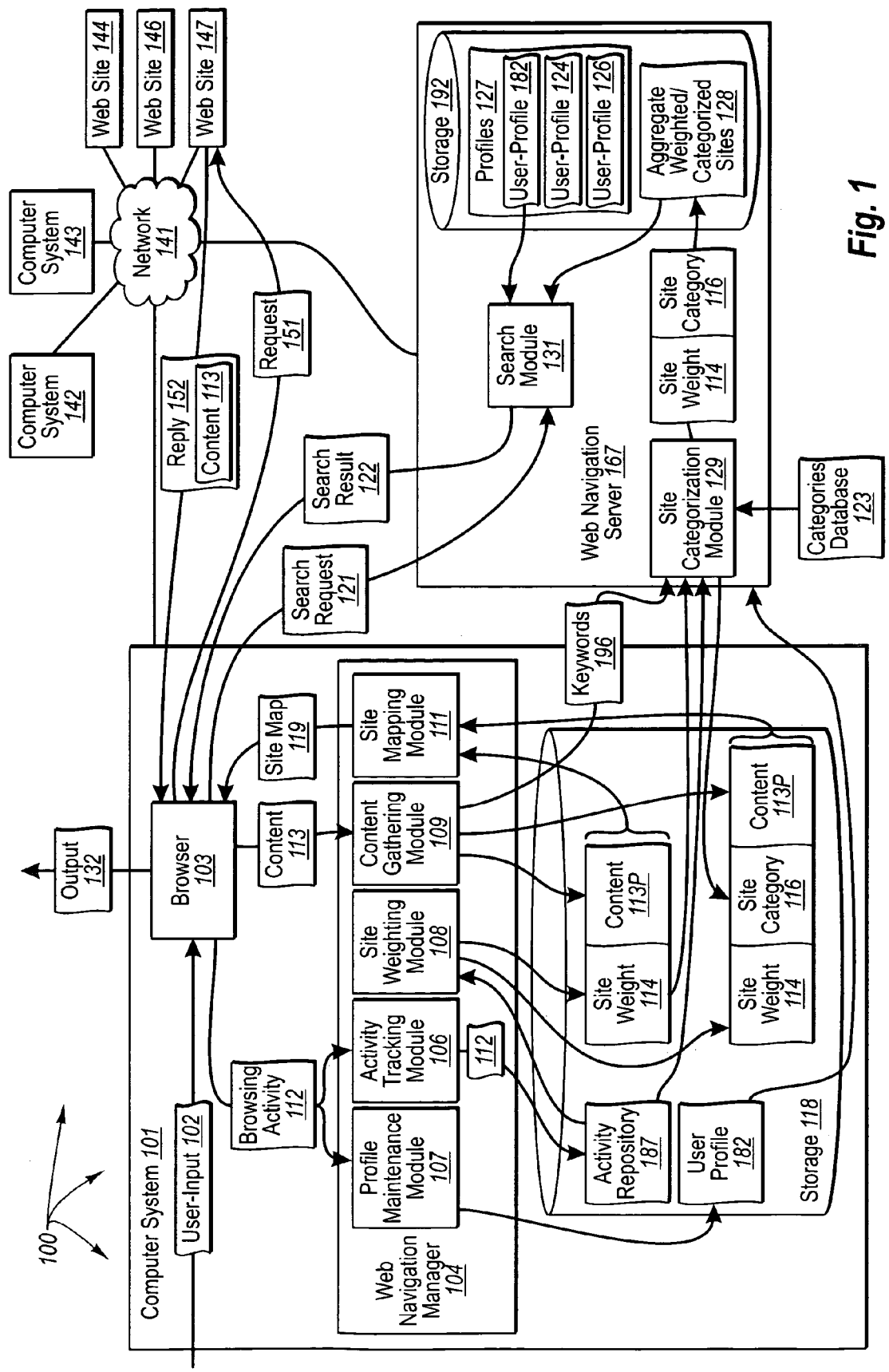
FIG. 1 illustrates an example of a computer architecture that facilitates mapping Web sites based on significance of contact with the Web sites and category of the Web sites.

The principles of the present invention provide for mapping Web sites based on significance of contact and category. In some embodiments, a computer system detects that the Web browser has contacted one or more Web sites. The computer system gathers a portion of content from each of the one or more contacted Web sites. The computer system assigns a weight to each Web site based on the significance of the Web browser's contact with the Web site. The computer system displays at least one gathered portion of content as a navigable item in a map of Web sites that includes at least one corresponding contacted Web site. The size of each at least one navigable item is varied based on the weight assigned to the corresponding Web site.

In other embodiments, a computer system determines that the Web browser has contacted one or more Web sites. The computer system receives key words for each of the one or more Web sites. The computer system compares the received key words for each of the one or more Websites to terms in a hierarchical category database. The computer system assigns each of the one or more Web sites to one or more corresponding categories included in the hierarchical category database based on the results of the comparison. The computer system generates site category data that can be used to display a portion of content from each of the one or more sites as a navigable item within a category boundary of a site map.

In further embodiments, a computer system identifies relevant search results in response to a search request. The computer system receives one or more search terms from a Web browser. The computer system compares the search terms to a plurality of weighted and categorized Web sites. The computer system identifies that one or more Web sites from among the plurality of weighted and categorized Web sites match the search terms based on the comparisons. The one or more identified Web sites being ordered for relevancy based on the weight and category of each of the one or more identified Web sites. The computer system accesses a user profile containing previous browsing activity for the Web browser. The computer system adjusts the relevancy of at least one of the one or more identified Web sites based on the previous browsing activity. The computer system returns the identified one or more Web sites to the browser in an altered order corresponding to the adjusted relevancy of any identified Web site.

Embodiments within the scope of the present invention include computer-readable media for carrying or having computer-executable instructions or data structures stored thereon. Computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Computer-executable instructions comprise, for example, instructions and data which cause a general-purpose computer system or special-purpose computer system to perform a certain function or group of functions. Computer executable instructions may be, for example, binaries, intermediate format instructions such as assembly language, or even source code.

In this description and in the following claims, a "network" is defined as one or more data links that enable the transport of electronic data between computer systems and/or modules. Local Area Networks ("LANs"), Wide Area Networks ("WANs") and the Internet are examples of networks.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates mapping Web sites based on significance of contact with the Web sites and category of the Web sites. Depicted in computer architecture 100 are computer systems 101, 142, and 143, Web sites 144, 146, and 147, and Web navigation server 167. Computer systems 101, 142, and 143, Web sites 144, 146, and 147, and Web navigation server 167 are connected to network 141, such as, for example, a Local Area Network ("LAN"), a Wide Area Network ("WAN"), or even the Internet, via various corresponding communication links. Thus, computer systems 101, 142, and 143, Web sites 144, 146, and 147, Web navigation server 167, and other network connected computer systems (not shown) can exchange data via network 141. Accordingly, computer systems 101, 142, and 143, Web sites 144, 146, and 147, Web navigation server 167, and other network connected computer systems, can create and exchange electronic messages over network 141. Electronic messages can include Internet Protocol ("IP") datagrams and can be transferred in accordance with other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol ("SOAP"), etc. Electronic messages can include content, such as, for example, content available on the World Wide Web.

Generally, computer systems 101, 142, and 143 can include Web browsers configured to browse content from Web sites, such as, for example, Web sites 144, 146, and 147. More specifically, computer system 101 includes browser 103 that can communicate with Web sites 144, 146, and 147 using a request/reply protocol, such as, for example, HTTP, to access content from Web sites 144, 146, and 147. Although represented generally as Web sites, Web sites 144, 146, and 147 can be implemented on computer systems that include Web server modules. The Web server modules can make the content of Web sites 144, 146, and 147 available to other computer systems connected to network 141.

Computer system 101 also includes Web navigation manager 104 and storage 118. Generally, the modules of Web navigation manager 104 interoperate with data in storage 118 to map Web sites based on the significance of contact with the Web sites and/or category of the Web sites. For example, modules of Web navigation manager 104 can monitor the browsing activity of and content accessed by browser 103. Based on the browsing activity and content, Web navigation manager can create maps of Web sites.

More specifically, activity tracking module 106 can track the browsing activity of browser 103. Profile maintenance module 107 can maintain user profiles based on browsing activity and accessed content of browser 103. Site weighting module 108 can weight Web sites based on browsing activity and accessed content of browser 103. Content gathering module 109 can gather content (e.g., thumbnails of Web site content) for presentation in Web site maps. Site mapping module can create Web site maps based on weighted and/or categorized Web sites and corresponding gathered content from the weighted and/or categorized Web sites.

Generally, Web navigation server 167 is configured to assist in creation of Web site maps and locating content. Modules of Web navigation server 167 can be configured to perform functions similar to those previously described with respect to computer system 101. Further, Web navigation server 167 includes site categorization module 129. Site categorization module 129 interoperates with category database 123 to categorize Web sites. Category database 123 can be a hierarchal category databases, such as, for example, a Dewey Decimal System database or United States Library of Congress Classification System database. Site categorization module can store weighted and/or categorized Web sites storage 192.

Storage 192 can also store a plurality of profiles, such as, for example, from users at computer systems 101, 142, and 143. As profile maintenance modules, such as, for example, profile maintenance modules 107, create user profiles, these profiles can be sent to Web navigation server 167 and stored in storage 192. The user profiles can subsequently be used to provide more relevant such results in response to search requests from users.

Generally, search module 131 is configured to receive search requests from a requesting computer system, identify relevant search results, and send the search results to the requesting computer system. More specifically, search module 131 can utilize weighted and/or categorized Web sites along with user profiles to provide more relevant search results in response to search requests from computer systems. Search module 131 can also utilize a user profile (e.g., for a user who initiated a search) to assist in retrieving relevant search results.

FIG. 2 illustrates an example flow chart of a method 200 for mapping Web sites based on the significance of contact with the Web sites. Method 200 will be described with respect to the modules and data in computer architecture 100.

Method 200 includes an act of detecting that the Web browser has contacted one or more Web sites (act 201). For example, activity tracking module 106 can detect that browser 103 has contacted Web site 147. In response to user-input 102, browser 103 can send request 151 (e.g., an HTTP GET) to Web site 147. In response to request 151, Web site 147 can send reply 152, including content 113, to browser 103. Reply 152 can be an HTTP message and content 113 can be included in the body of the HTTP message. Content 113 can be a document located at a URL that was included in request 151.

These activities (along with other activities of browser 103) are collectively represented as browsing activity 112. Activity tracking module 106 can monitor browsing activity 112 and store browsing activity in storage 118. Contact with a Web site can include sending a request to a Web site and receiving a corresponding reply from the Web site. Thus, in response to monitoring request 151 and replay 152, activity tracking module 106 detects that browser 103 has contacted Web site 147. Activity tracking module 106 can also detect contact with other Web sites, such as, for example, Web sites 144 and 146. Detected contact can include detecting various activities at a specified Web site, such as, for example, using navigational controls for scrolling and paging forward and back, identifying a Web site contacted before the specified Web site was contacting, identifying a Web site contact after the specified Web site was contacting, etc.

Activity tracking module 106 can maintain browsing activity and historical browsing data in activity repository 187. Historical browsing data can include the number of visits to other sites between visits to a specified site, the total number of sites visited since a specified site was last visited, active time on a site, number of visits to a site over specified period of time, number of visits to a site per session, elapsed time visiting other sites in the same domain as a specified site, number of visits to other sites in the same domain as a specified site, and number of visits to sites in the same category as a specified site since the last visit to the specified site. Activity tracking module 106 can maintain historical browsing data per Web site.

Method 200 includes an act of gathering a portion of content from each of the one or more contacted Web sites (act 202). For example, content gathering module can gather content 113P (a portion of content 113) from reply 152. Content 113P can be graphical data, such as, for example, a thumbnail of the homepage of Web site 147.

Method 200 includes an act of assigning a weight to each Web site based on the significance of the Web browser's contact with the Web site (act 203). For example, site weighting module 108 can assign site weight 114 to Web site 147 based on the significance of Web browser 103's contact with Web site 147. Weight can be assigned to a Web site using an algorithm that processes browsing activity 112 and historical browsing data included in activity repository 187.

For example, a site weight for a specified Web site can be calculated by an algorithm implementing the following formula:

$$aT+bU+cV+dW+eX+fY-(gQ+hR+iS)$$

where

T=Active time of the specified site (time interacting with site where elapsed time of inactivity does not exceed a specified threshold, for example, 45 seconds)

U=Total number of visits to the specified site over a specified period of time (e.g., 21 days)

V=Average # of visits to the specified site per browser session (e.g., from opening to closing browser)

W=Time visiting other pages in same domain as the specified site

X=Number of visits to other pages in the same domain as the specified site

Y=Activity on the specified site (e.g., scrolling, paging forward and back, etc.)

Q=Number of sites visited in the same category as the specified site since last visit to the specified site R=Total number of sites visited since last visit to the specified site S=Total browsing time since last visit to the specified site and, a, b, c, d, e, f, c, h, and i can be constants or functions over time that individually modify a corresponding variable.

Site weighting module 108 can assign weights to other Web sites, such as, for example, Web sites 144 and 146, in the same or a similar manner.

Method 200 includes an act of displaying at least one gathered portion of content as a navigable item in a map of Web sites that includes at least one corresponding contacted Web site, the size of each at least one navigable item varying based on the weight assigned to the corresponding Web site (act 204). For example, site weight 114 and content 113P can be provided as input to site mapping module 111. Site mapping module 111 can in turn generate a navigable item that includes content 113P and that can be selected to access Web site 147. The display size of the content 113P can vary based on the site weight 114.

Creating a navigable item for Web site 147 can include associating content 113P with a URL (obtained from monitoring browsing activity) for Web site 147 such that if content 113P is selected from a display (e.g., clicked on), browser 103 navigates to Web site 147. Site mapping module 111 can also create navigable items (e.g., homepage thumbnails) for other Web sites, such as, for example, Web sites 144 and 146.

Site mapping module 111 can be configured to create a site map that includes a plurality of navigable items to Web sites. For example, site mapping module 111 can create site map 119 that includes navigable items at least for Web sites 144, 146, and 147. Site mapping module 111 can send the site map to browser 103. Site mapping module 111 can format site map 119 to include instructions, such as, for example, HTML or XML instructions, that are compatible with browser 103. Browser 103 can receive site map 119 and display site map 119 as output 132 at a video display device. Thus, output 132 represents data that can be used to generate a display at video display device.

Figure 4:
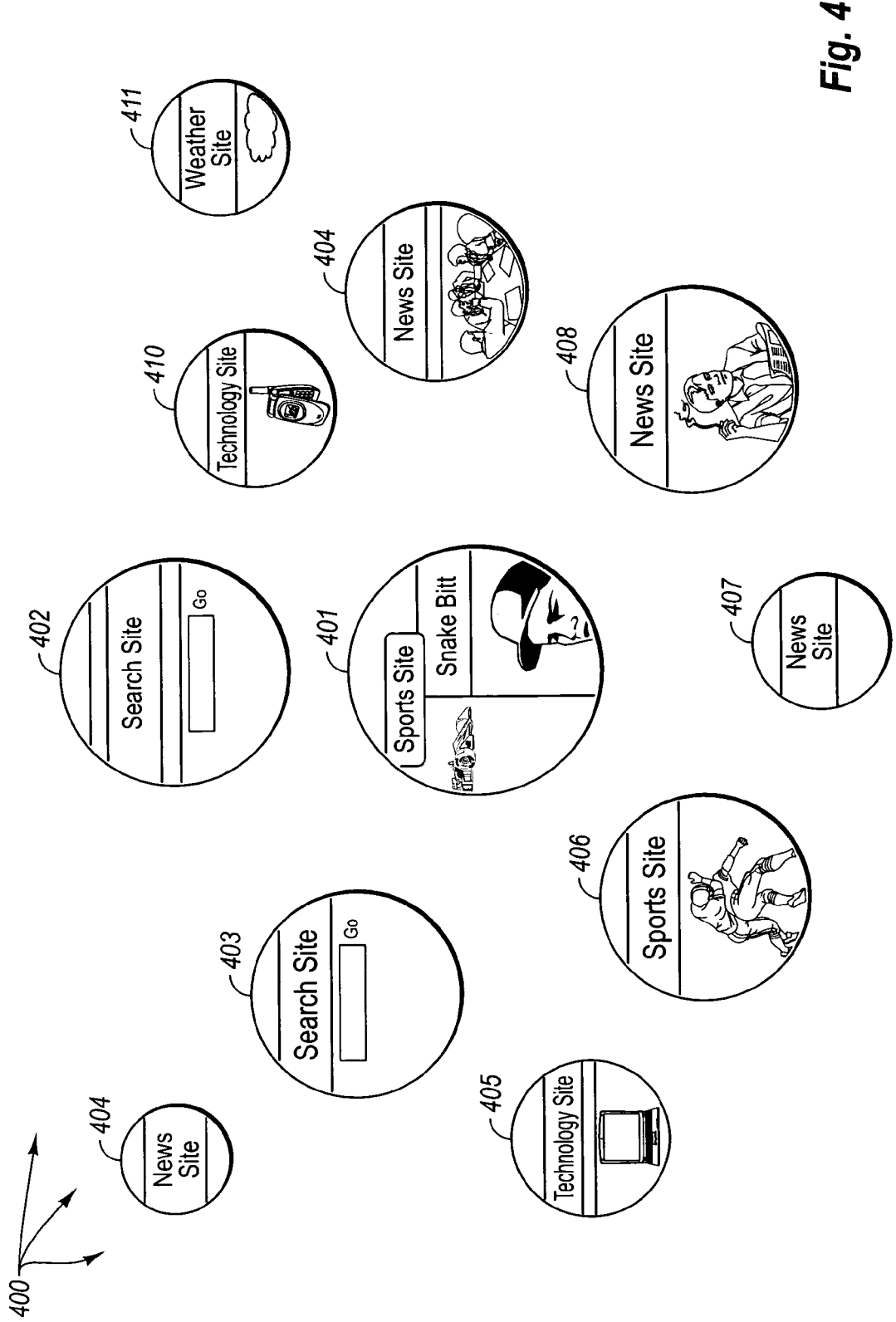
FIG. 4 is an example display of navigable items to Web sites that are mapped based on the significance of contact with the Web sites.

FIG. 4 is an example display 400 of navigable items to Web sites that are mapped based on the significance of contact with the Web sites. It may be that display 400 is generated from output 132. Depicted in display 400 are navigable items for sports site 401, search site 402, search site 403, news site 404, technology site 405, sports site 406, news site 407, news site 408, news site 409, news site 410 and weather site 411.

Within display 400, the size of navigable items varies based on site weight. That is, navigable items for Web sites having a greater site weight are displayed larger relative to other navigable items. On the other hand, navigable items for Web sites having a lesser site weight are displayed smaller relative to other navigable items. For example, the navigable item for sports site 401 is displayed larger than the navigable item for technology site 405. This difference in size indicates that the site weight for sports site 401 is greater than the site weight for technology site 405. On the other hand, the navigable item for news site 407 is displayed smaller than the navigable item for search site 402. This difference in size indicates that the site weight for news site 407 is less than the site weight for search site 402.

Figure 5:
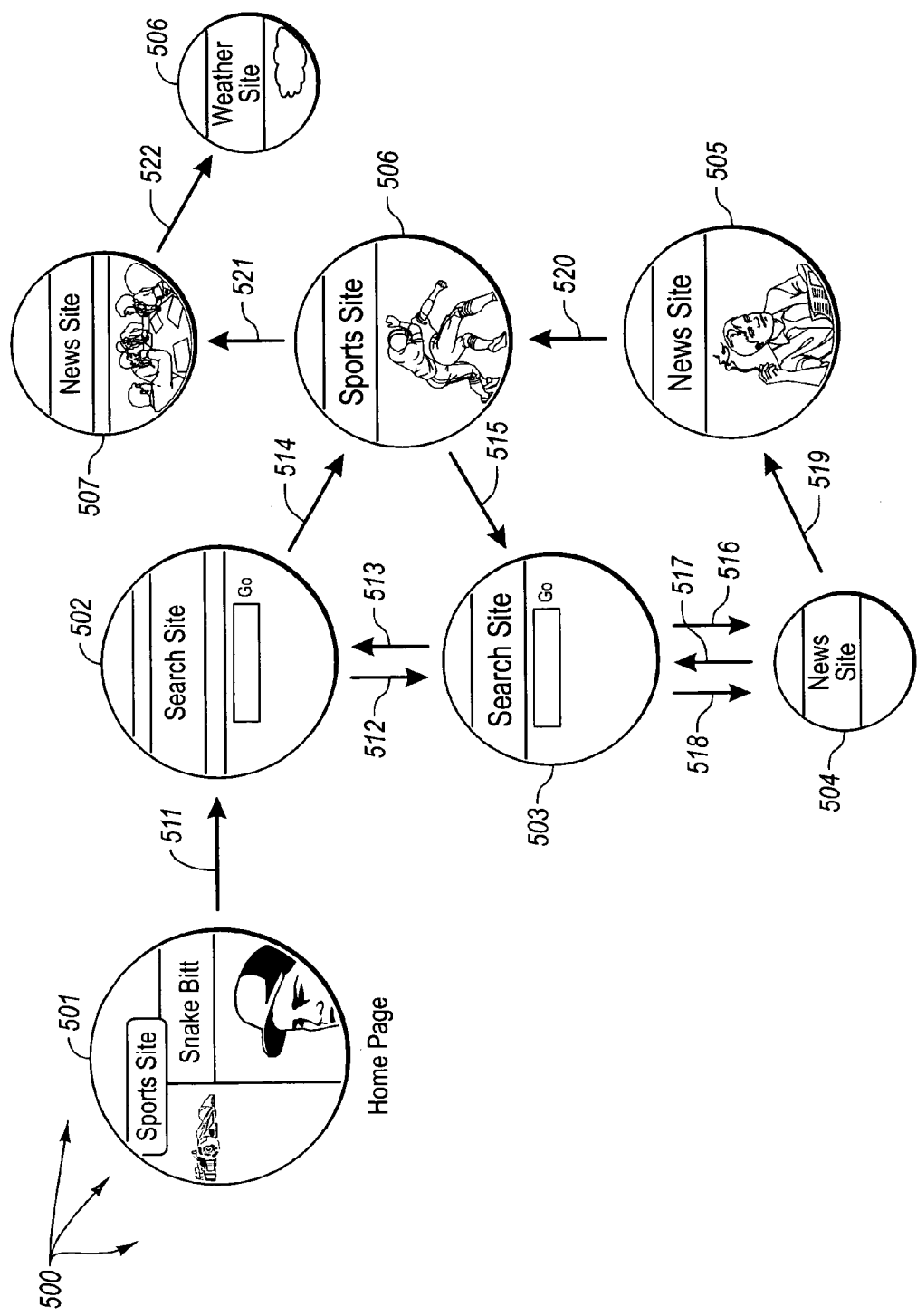
FIG. 5 is an example display of navigable items Web sites that are mapped based on the significance of contact with the Web sites and depicted the path traveled between Web sites.

In some embodiments, activity tracking module 106 is further configured to track the order in which Web sites were visited during a browsing session. The order in which Web sites were visited during a session can be included in browsing activity 112. Site mapping module 111 can visually represent this ordering as a path through different Web sites. FIG. 5 is an example display 500 of navigable items to Web sites that are mapped based on the significance of contact with the Web sites and depicted the path traveled between Web sites. It may be that display 500 is generated from output 132. Depicted in display 500 are navigable items for sports site 501, search site 502, search site 503, news site 504, news site 505, sports site 506, news site 507, and weather site 508.

Within display 500, the size of navigable items varies based on site weight. That is, navigable items for Web sites having a greater site weight are displayed larger relative to other navigable items. On the other hand, navigable items for Web sites having a lesser site weight are displayed smaller relative to other navigable items. Further, the path through the different Web sites is indicated by arrows 511 through 522. High numbers indicating arrows that occur later in time.

The map begins at sports site 501. Arrow 511 indicates that a browsing session next accessed search site 502. Arrow 512 indicates that the browsing session next accessed search site 503. Arrow 513 indicates that the browsing session next accessed (returned to) search site 502. Arrow 514 indicates that the browsing session next accessed sports site 506. Arrow 515 indicates that the browsing session next accessed (returned to) search site 503.

Arrow 516 indicates that the browsing session next accessed news site 504. Arrow 517 indicates that the browsing session next accessed (returned again to) search site 503. Arrow 518 indicates that the browsing session next accessed (returned to) news site 504. Arrow 519 indicates that the browsing session next accessed news site 505. Arrow 520 indicates that the browsing session next accessed (returned to) sports site 506. Arrow 521 indicates that the browsing session next accessed news site 507. Arrow 522 indicates that the browsing session next accessed weather site 508.

Although described with respect to the modules and data of computer system 101, the method 300 can also be implemented through similar modules at Web navigation server 167. For example, Web navigation server 167 can include an activity tracking module, a site weighting module, a content gathering module, and a site mapping module. Network messaging can be used to exchange browsing activity, content, and site maps between computer system 101 and Web navigation server 167. Web navigation server 167 can also include an activity repository.

FIG. 3 illustrates an example flow chart of a method 300 for mapping Web sites based on the category of the Web sites. Method 300 will be described with respect to the modules and data in computer architecture 100.

Method 300 includes an act of determining that a Web browser has contacted one or more Web sites (act 301). For example, as previously described, activity tracking module 106 can detect the Web sites that browser 103 contacts. Computer system 101 can send a list of contacted Web sites to Web navigation server 167. Web navigation server 167 can receive the list and determine that browser 103 has contacted one or more Web sites based on the contents of the list.

Method 300 includes an act of receiving key words for each of the one or more Web sites (act 302). For example, site categorization module 129 can gather key words 196 from content gathering module 109. Content gathering module 109 can strip a portion of key words 196 from content 113. For example, content gathering module 109 can include a stripping algorithm that searches a Web page for terms that are repeated, such as, for example, in titles and headings. The stripping routine can be configured to ignore more commonly used words (e.g., the, at, to, etc.) and instead strip more specific terms from a Web page. Portions of key words 196 can also be gathered from terms entered into a search bar (e.g., in communication with search module 131) and from previously visited sites (e.g., maintained in an activity repository similar to activity repository 187).

Method 300 includes an act comparing the received key words for each of the one or more Websites to terms in a hierarchical category database (act 303). For example, site categorization module 129 can compare keywords 196 (e.g., for Web sites 144, 146, and 147) to terms in category database 123.

Method 300 includes an act of assigning each of the one or more Web sites to one or more corresponding categories included in the hierarchical category database based on the results of the comparisons (act 304). For example, site categorization module can assign each of Web sites 144, 146, and 147 to one or more categories included in category database 123 based on the results of comparing key words 196 to terms in category database 123. Assigned categories can be, for example, sports, news, weather, technology, history, government, etc.

Method 300 includes an act of generating site category data that can be used to display a portion of content from each of the one or more sites as a navigable item within a category boundary of a site map (act 305). For example, site categorization module 129 can generate site category 116 that can be used to display connect 11 3P as a navigable item with a category boundary of site map 119. Site categorization module 129 can send site category 116 to storage 118. Site category 116 can be stored along with site weight 114 and content 113P.

Alternately, site category 116 can be stored along with site weight 114 in aggregate weighted/categorized sites 128. Aggregate weighted/categorized sites 128 can include a database of contacted Web sites that are weighted and categorized across a plurality of computer systems. For example, Web navigation server 147 can include a site weighting module that weights Web sites based on browsing activity and historical browsing data from a plurality of different computers connected to network 141. Thus, Web sites that are contacted more frequently based browsing activity and historical browsing data from the plurality of computer systems will have higher weights. On the other hand, Web sites that are contacted less frequently based on browsing activity and historical browsing data from the plurality of computer systems will have lower weights.

Subsequently, site weight 114, site category 116, and content 113P can be sent to site mapping module 111. Site mapping module 111 can create site map 119 that includes navigable items at least for Web sites 144, 146, and 147. Site mapping module 111 can send the site map to browser 103. Site mapping module 111 can format site map 119 to include instructions, such as, for example, HTML or XML instructions, that are compatible with browser 103. Browser 103 can receive site map 119 and display site map 119 as output 132 at a video display device. Thus, output 132 represents data that can be used to generate a display at video display device.

Output 132 can include data representing graphical elements for one or more of the categories included in the hierarchical category database. The displayed graphical elements can include boundaries that separate each of the one or more displayed categories from one another within the display. Output 132 can also include data for displaying a portion of content from each of the one or more Web sites as a navigable item within the boundaries of each corresponding category that was assigned to each of the one or more Web sites.

Figure 6:
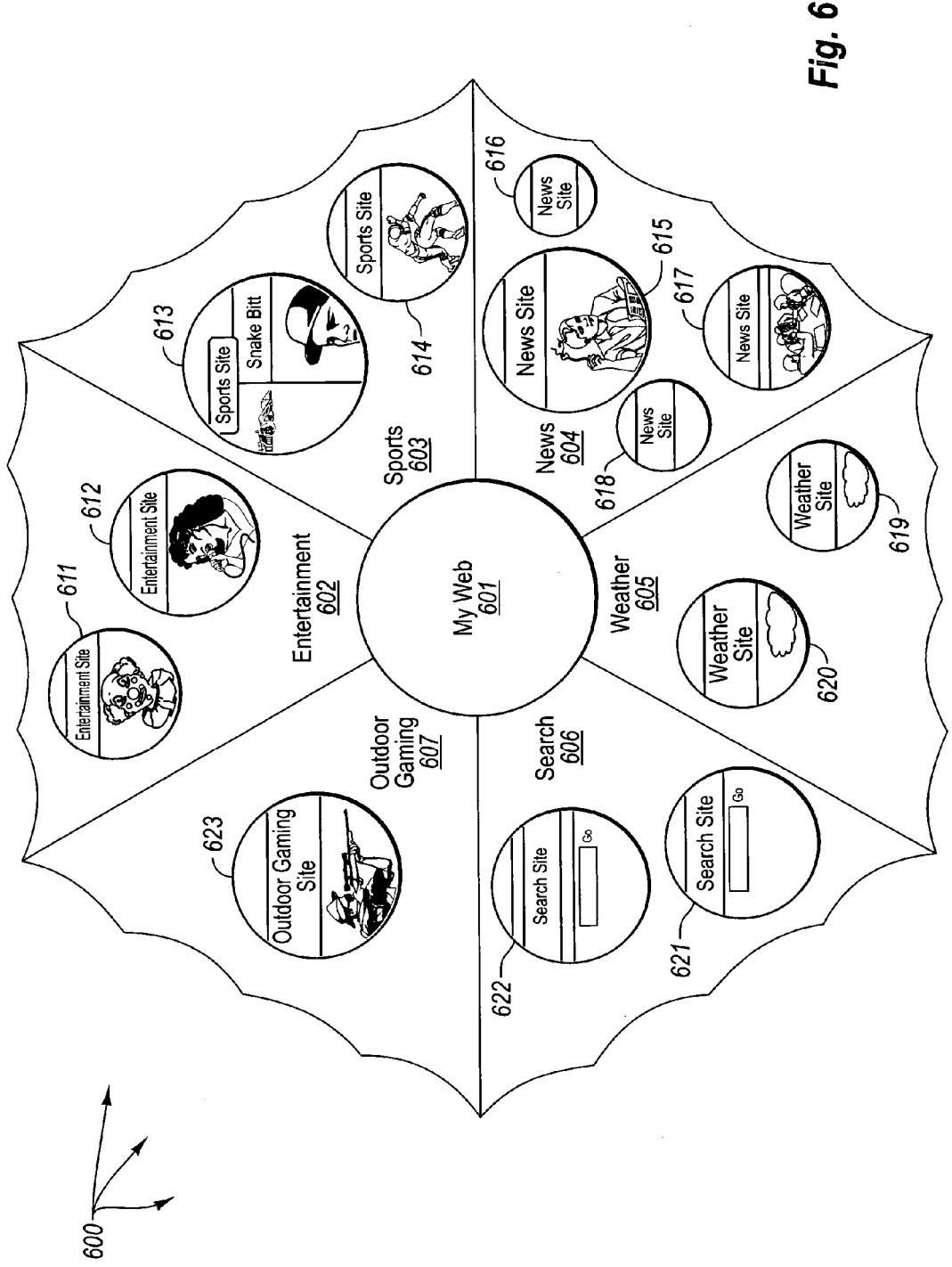
FIG. 6 is an example display of navigable items to Web sites that are mapped based on the significance of contact with the Web sites and category of the Web sites.

FIG. 6 is an example display 600 of Web sites that are mapped based on the significance of contact with the Web sites and category of the Web sites. It may be that display 600 is generated from output 132. Similar to displays 400 and 500, within display 600, the size of navigable items varies based on site weight. That is, navigable items for Web sites having a greater site weight are displayed larger relative to other navigable items. On the other hand, navigable items for Web sites having a lesser site weight are displayed smaller relative to other navigable items.

Depicted in display 600 are navigable items for entertainment sites 611 and 612, outdoor gaming site 623, search sites 621 and 622, weather sites 619 and 620, news sites 615, 616, 617, and 618, and sports sites 613 and 614. Each of the navigable items is displayed within the boundaries of a corresponding category. That is, entertainment sites 611 and 612 are displayed within the boundaries of entrainment category 602. Outdoor gaming site 623 is displayed with in the boundaries of outdoor gaming category 607. Search sites 621 and 622 are displayed within the boundaries of search category 606. Weather sites 619 and 620 are displayed within the boundaries of weather category 605. News sites 615, 616, 617, and 618 are displayed within the boundaries of news category 604. Sports sites 613 and 614 are displayed within the boundaries of sports category 603.

Figure 7:
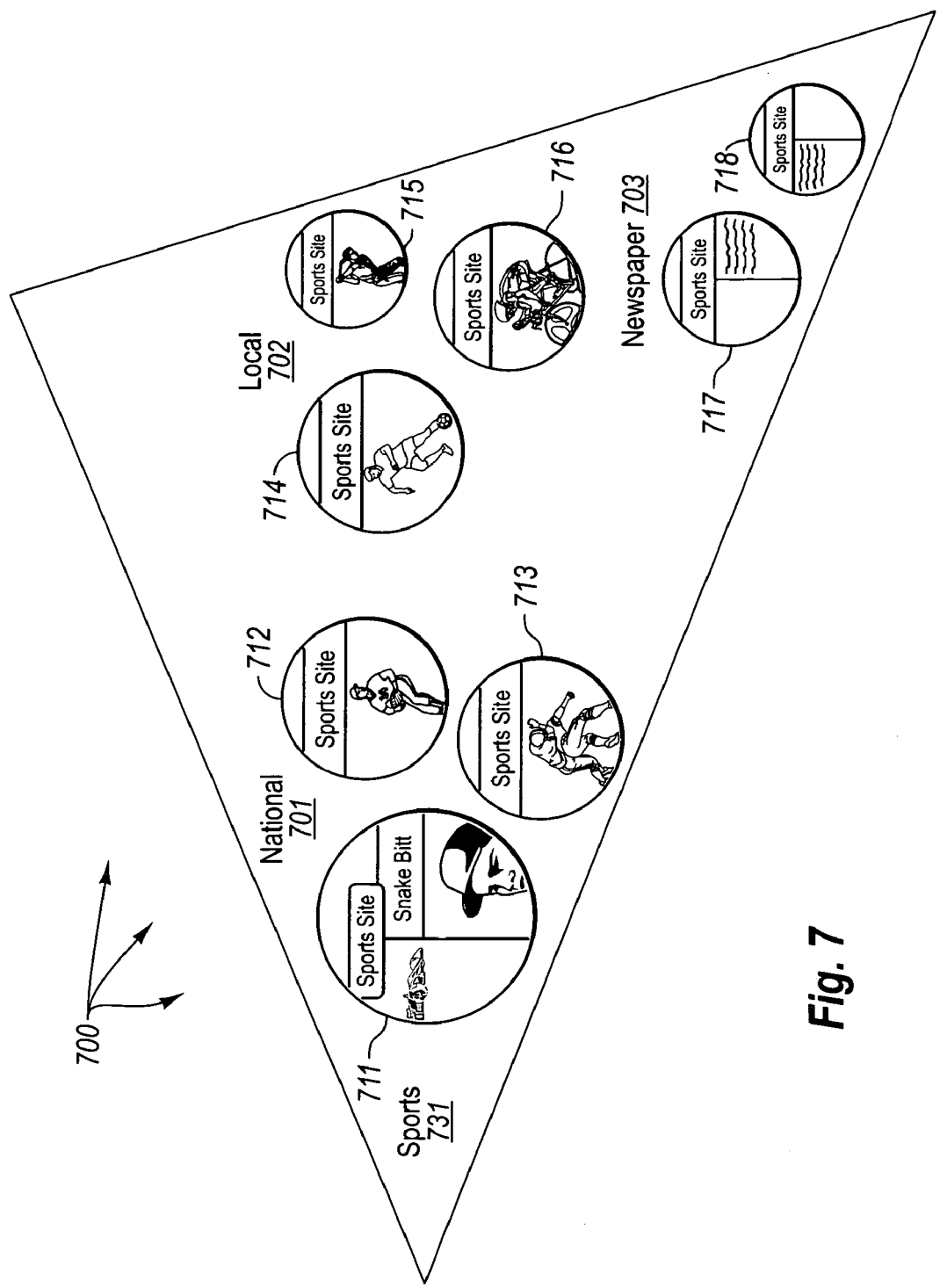
FIG. 7 is an example display of a subcategory of navigable items Web sites that are mapped based on the significance of contact with the Web sites and category of the Web sites.

In some embodiments, Web sites are assigned multiple categories within a category hierarchy. In these embodiments, site category data can indicates that a Web site is assigned to a category and one or more subcategories within the category. FIG. 7 is an example display of a subcategory of Web sites that are mapped based on the significance of contact with the Web sites and category of the Web sites. Similar to displays 400, 500 and 600, within display 700, the size of navigable items varies based on site weight. That is, navigable items for Web sites having a greater site weight are displayed larger relative to other navigable items. On the other hand, navigable items for Web sites having a lesser site weight are displayed smaller relative to other navigable items.

Display 700 depicts subcategories national 701, local 702, and newspaper 703 within sports category 731. The subcategories national 701, local 702, and newspaper 703 may become visible and the size of sports category 731 expanded when sports category 731 is selected from a higher level map (e.g., of display 600). As depicted in display 700, sports sites 711, 712, and 713 are included in subcategory national 701, sports sites 714, 715, and 716 are included in local subcategory local 702, and sports sites 7171 and 718 are included in subcategory newspaper 703.

Accordingly, embodiments of the present invention can provide a user visual cues relating to previously accessed Web sites. These cues can assist the user in re-accessing the same Web sites at a later time. Since the cues are visual, and in some embodiments are content from a Web site, a user is provided with a visual context when attempting to re-access a Web site. This can make re-access a Web site more efficient. Additional efficiency can be gained when the visual cues are also categorized.

As previously described, profile maintenance module 107 can maintain user profiles for users of browser 103. Profile maintenance module 107 can, from time to time, send user profiles for storage in profiles 127. Profiles 127 can store profiles from a plurality of different computer systems such as, for example, computer systems 101, 142, and 143. Also as previously described, aggregate weighted/categorized sites 128 can include Web sites that are weighted and categorized across a plurality of computer systems.

Based on stored profiles, search module 131 can provide more relevant results in response to search requests. For example, in response to search request 121 from browser 103, search module 131 can refer to user profile 182 and aggregate weighted/categorized sites 128. Search module 131 can utilize profile 182 to assist in ascertaining the meaning of search request 121, such as, for example, to resolve ambiguity.

For example, search request 121 can include the term "cookie". Through text matching to sites in aggregate weighted/categorized sites 128, search module 131 can identify cooking Web sites and Web programming Web sites. Further, reference to user profile 182 can indicate that browser 13 has frequently vested other cooking Web sites but has only rarely visited Web programming Web sites. Accordingly, search module 131 can return cooking Web sites as more relevant Web sites in search results 122.

Figure 9:
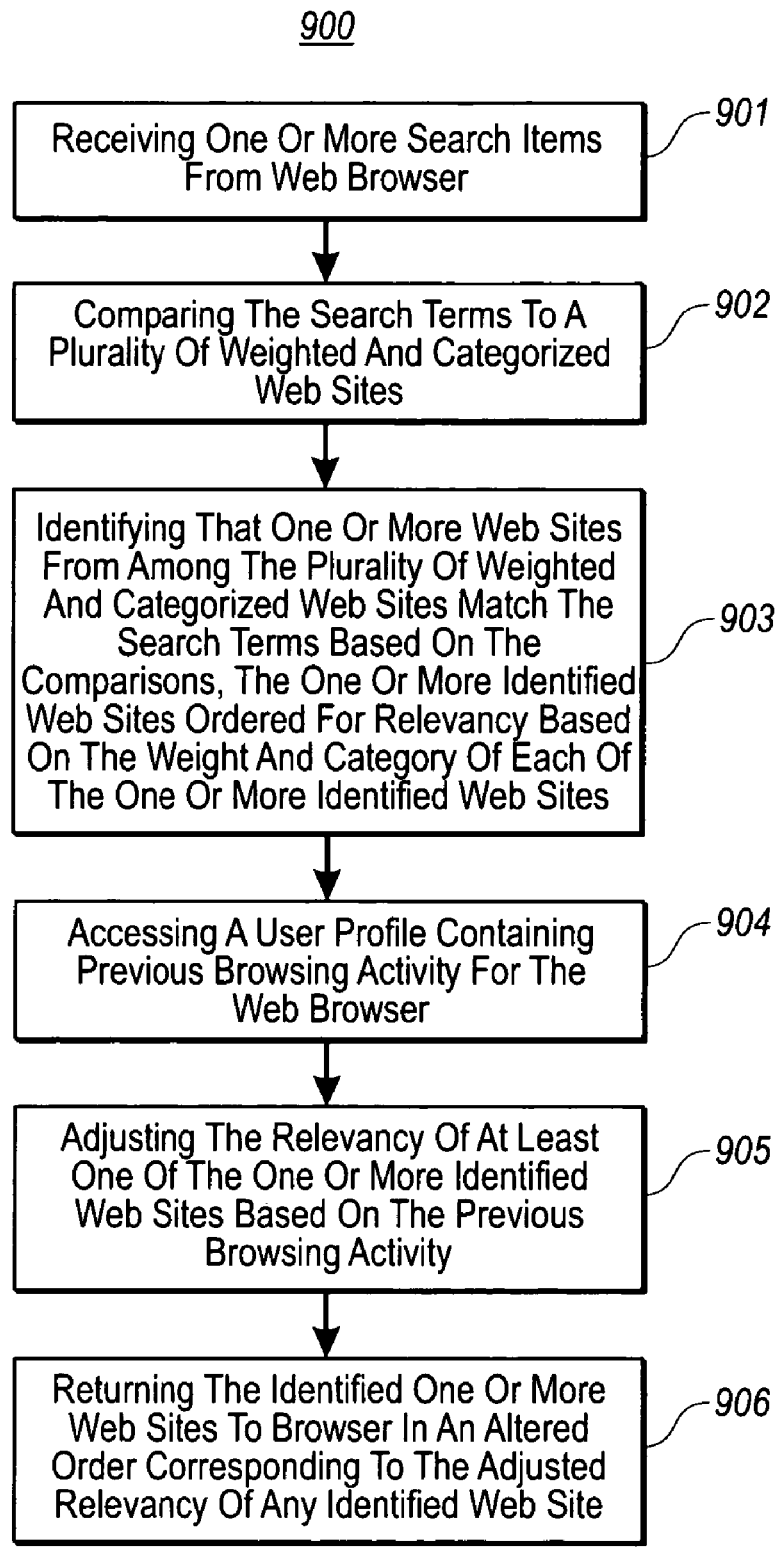
FIG. 9 illustrates an example flow chart of a method for identifying relevant search results in response to a search request.

FIG. 9 illustrates an example flow chart of a method 900 for identifying relevant search results in response to a search request. Method 900 will be described with respect to the module and data in computer architecture 100.

Method 900 includes an act of receiving one or more search terms from, a Web browser (act 901). For example, search module 131 can receive search request 121 from browser 103. Search request 121 can include one or more search terms that were entered at browser 103 (e.g., as a result of user-input 102).

Method 900 includes an act of comparing the search terms to a plurality of weighted and categorized Web sites (act 902). For example, search module 131 can compare terms in search request 121 to aggregate weighted/categorized sites 128.

Method 900 includes an act of identifying that one or more Web sites from among the plurality of weighted and categorized Web sites match the search terms based on the comparisons (act 903). The one or more identified Web sites are ordered for relevancy based on the weight and category of each of the one or more identified Web sites. For example, search module 131 can identify Web sites 144, 146, and 147 from aggregate weighted/categorized sites 128 that match search terms include in search request 121. Search module 131 can order Web sites 144, 146, and 147 for relevancy based on the weight and category of each of Web sites 144, 146, and 147. Weight can be based on the aggregate contact with the Web site from Web browsers at a plurality of different computer systems.

Method 900 includes an act of accessing a user profile containing previous browsing activity for the Web browser (act 904). For example, search module 131 can access user profile 182 from profiles 127. Profile 182 can contain previous browsing activity for browser 103, such as, for example, browsing activity and historical browsing data from activity repository 187.

Method 900 includes an act of adjusting the relevancy of at least one of the one or more identified Web sites based on the previous browsing activity (act 905). For example, search module 131 can adjust the relevancy of at least one of Web sites 144, 146, and 147 based on browsing activity and historical browsing data contained in profile 182. Adjusting relevancy can include altering the meaning of a search term based on the usage and/or meaning of the search term at previously visited Web sites.

Method 900 includes an act returning the identified one or more Web sites to the browser in an altered order corresponding to the adjusted relevancy of any identified Web site (act 906). For example, search module 131 can return search results 122 to browser 103. The order of Web sites 144, 146, and 147 in search results 122 can be altered to correspond to the adjusted relevancy of Web sites 144, 146, and 147. Accordingly, embodiments of the present invention also facilitate the identification of more relevant search results based on a browser's previous browsing activity.

Figure 8:
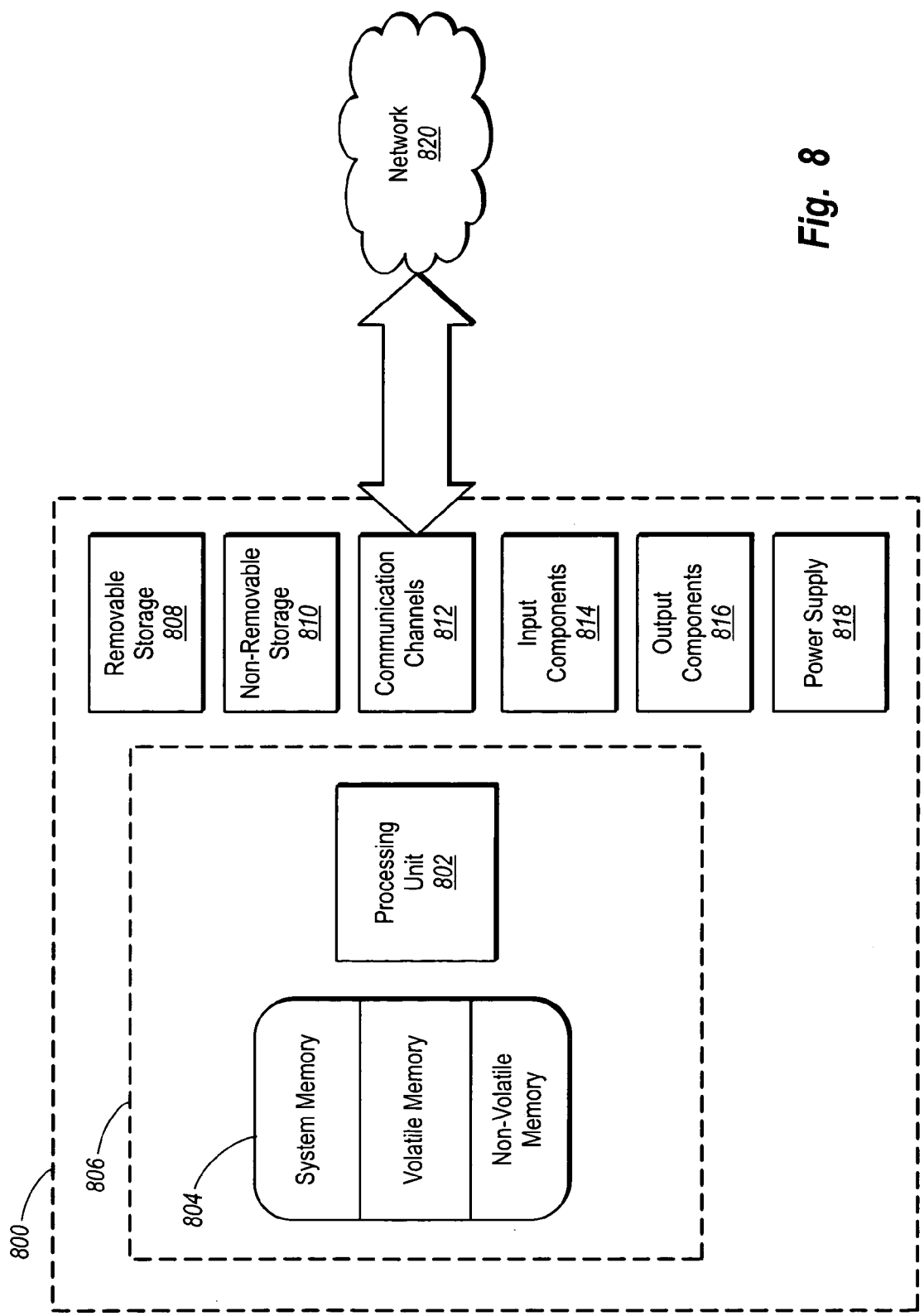
FIG. 8 illustrates a suitable operating environment for the principles of the present invention.

FIG. 8 illustrates a suitable operating environment for the principles of the present invention. For descriptive purposes, the depicted computer system is only one example of a suitable environment and is not intended to suggest any limitation as to the scope of use or functionality of the invention. Neither should the computer systems be interpreted as having any dependency nor requirement relating to any one or combination of components illustrated in FIG. 8.

In some basic configurations, computer system 800 includes at least one processing unit 802 and memory 804. The memory 804 may be volatile (such as RAM), non-volatile (such as ROM, flash memory, etc.), or some combination of the two. One basic configuration is illustrated in FIG. 8 by the dashed line 806.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 8 by removable storage 808 and non-removable storage 810. Computer-storage media include volatile and non-volatile, removable and non-removable media implemented in any method or technology for storage of information such as computer-readable instructions, data structures, program modules, or other data. Memory 804, removable storage 808, and non-removable storage 810 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computer system.

Computer system 800 may also contain communication channels 812 that allow the host to communicate with other systems and devices over a network 820. Communication channels 812 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 800 may also have input components 814 such as a keyboard, mouse, pen, a voice-input component, a touch-input device, and so forth. Output components 816 include screen displays, speakers, printer, etc., and rendering modules (often called "adapters") for driving them. The computer system 800 has a power supply 818. All these components are well known in the art and need not be discussed at length here.

While FIG. 8 represents a suitable operating environment for the present invention, the principles of the present invention may be employed in any system that is capable of, with suitable modification if necessary, implementing the principles of the present invention. The environment illustrated in FIG. 8 is illustrative only and by no means represents even a small portion of the wide variety of environments in which the principles of the present invention may be implemented.

In accordance with the present invention, modules including applications, resource managers, and transaction managers, as well as associated data, including transaction, transaction scopes, transaction ambient state, operations, call back pointers, and call backs can be stored and accessed from any of the computer-readable media associated with computer system 800. When a mass storage device, such as, for example, non-removable storage 810, is coupled to computer system 800, such modules and associated program data may also be stored in the mass storage device. In a networked environment, program modules depicted relative to computer system 800, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system including a Web browser, a method for presenting a map of user-traversed Web sites from a Web browsing session, the method comprising:

for each of a plurality of Web sites the Web browser traverses during a Web browsing session:
an act of tracking various activities indicative of Web browser has contact with the traversed Web sites;
an act of gathering a representative portion of accessed content from each the traversed Web sites, the representative portion being actual content from the traversed Web sites;

subsequent to the Web browsing session ending and for each of the plurality of traversed Web sites traversed during the Web browsing session:

an act of deriving a relative weight for the traversed Web site based on the various activities tracked for the traversed Web site during the Web browsing session, the relative weight indicative of significance of contact with the traversed Web site relative to other traversed Web sites; and an act of visually displaying a Web site map of the plurality of traversed Web sites traversed during the Web browsing session, the Web site map including visually displaying a geometric shape navigable item for each of the plurality of traversed Web sites, each geometric shape navigable item being specific to a single one of the traversed Web sites, and each geometric shape navigable item visually displaying and containing the accessed representative content from the corresponding traversed Web site, and such that the size of geometric shape navigable item varying based on the relative weight for the corresponding traversed Web site so as to visually represent the significance of the contact with the traversed Web site, including increased size of geometric shape navigable items to thereby indicate traversed Web sites having more significant contact and reduced size of geometric shape navigable items to thereby indicate traversed Web sites having less significant contact, such that the geometric shape navigable items for the plurality of traversed Web sites traversed during the Web browsing session are simultaneously displayed with varying sizes to thereby indicate significance of contact with the respective traversed Web site.

2. The method as recited in claim 1, wherein the act of tracking various activities indicative of Web browser contact with the traversed Web sites comprises:

an act of the Web browser sending an HTTP GET to a the traversed Web site; and an act of the Web browser receiving a corresponding HTTP message responsive to the HTTP GET.

3. The method as recited in claim 1, wherein the act of tracking detecting various activities indicative of that the Web browser has contacted one or more with the traversed Web sites comprises an act of detecting that the Web browser utilized Web browsing navigational controls to navigate at a Web site.

4. The method as recited in claim 1, wherein the act of gathering a representative portion of accessed content from the traversed Web sites comprises an act of gathering a thumbnail of the homepage of the traversed Web site.

5. The method as recited in claim 1, wherein the act of deriving a relative weight for the traversed Web site based on the various activities tracked for the traversed Web site during the Web browsing session comprises an act of accessing browsing activity from an activity repository.

6. The method as recited in claim 1, wherein the act of deriving a relative weight for the traversed Web site based on the various activities tracked for the traversed Web site during the Web browsing comprises an act of assigning a weight to a Web site based on the Web browser's active time at the Web site.

7. The method as recited in claim 1, wherein the act of deriving a relative weight for the traversed Web site based on the various activities tracked for the traversed Web site during the Web browsing session comprises an act of assigning a weight to a Web site based on the Web browser's total number visits to the Web site.

8. The method as recited in claim 1, wherein the act of deriving a relative weight for the traversed Web site based on the various activities tracked for the traversed Web site during the Web browsing session comprises an act of assigning a weight to a Web site based on the Web browser's average number of visits to the Web site per Web browsing session.

9. The method as recited in claim 1, wherein the act of deriving a relative weight to each for the traversed Web site based on the various activities tracked for the traversed Web site during the Web browsing session comprises an act of assigning a weight to a Web site based on the Web browser's time visiting other pages in the same domain as the Web site.

10. The method as recited in claim 1, wherein the act of deriving a relative weight for the traversed Web site based on the various activities tracked for the traversed Web site during the Web browsing session comprises an act of assigning a weight to a Web site based on the Web browser's number of visits to other pages in the same domain as the Web site.

11. The method as recited in claim 1, wherein the act of deriving a relative weight for the traversed Web site based on the various activities tracked for the traversed Web site during the Web browsing session comprises an act of assigning a weight to a Web site based on the Web browser's number of visits to other Web sites that are categorized similarly to the Web site.

12. The method as recited in claim 1, wherein the act of deriving a relative weight for the traversed Web site based on the various activities tracked for the traversed Web site during the Web browsing comprises an act of assigning a weight to a Web site based on the number of other Web sites visited since the Web browser last visited the Web site.

13. The method as recited in claim 1, wherein the act of deriving a relative weight for the traversed Web site based on the various activities tracked for the traversed Web site during the Web browsing comprises an act of assigning a weight to a Web site based on the total browsing time since the Web browser last visited the Web site.

14. The method as recited in claim 1, wherein the act of visually displaying a Web site map of the plurality of traversed Web sites traversed during the Web browsing session sites comprises an act of visually displaying traversal graphical elements between geometric shape navigable items, the traversal elements collectively indicating the order in which the plurality of traversed Web sites were traversed during the Web browsing session.

15. The method as recited in claim 1, further comprising:

an act of receiving assigned categories for each of the plurality of traversed Web sites, the categories identified from a hierarchical category database.

16. The method as recited in claim 15, wherein the act of receiving assigned categories for each of the plurality of traversed Web sites comprises an act of receiving categories identified from a Dewey Decimal System database.

17. The method as recited in claim 15, wherein the act of act of visually displaying a Web site map of the plurality of traversed Web sites traversed during the Web browsing session comprises an act of visually displaying a category indicator within the boundaries of each geometric shape navigable item, the category indicator indicating the category from among those categories in the hierarchical category database, of the accessed content from the corresponding traversed Web site.

18. At a computer system including a Web browser, a method for presenting a map of contacted Web sites, the method comprising:

an act of determining that the Web browser has contacted a plurality of Web sites;

an act of receiving key words for each of the plurality of contacted Web sites;

an act of comparing the received key words for each of the plurality of contacted Websites to terms in a hierarchical category database;

an act of assigning each of the plurality of contacted Web sites to a category included in the hierarchical category database based on the results of the comparisons;

an act of visually displaying a categorized Web site map of the plurality of contacted Web sites, the Web site map including:

for each of the assigned categories, visually displaying a category geometric shape representing the assigned category, the category geometric shape indicating a boundary for Web sites assigned to the assigned category relative to the category geometric shapes for other assigned categories;

for each of the contacted Web sites, visually displaying a geometric shape navigable item for the contacted Web site within the boundaries of the category geometric shape representing the assigned category assigned to the contacted Web site so as to visually indicate assignment of the contacted Web site to the assigned category, each geometric shape navigable item being specific to a single one of the contacted Web sites, and each geometric shape navigable item containing representative content from the contacted Web site, the representative content being actual content from the contacted Web site, wherein the size of each geometric shape navigable item varies based on significance of contact with the contacted Web site so as to visually represent the significance of the contact with the contacted Web site, including increased size of geometric shape navigable items to indicate traversed Web sites having more significant contact and reduced size of geometric shape navigable items to indicate traversed Web sites having less significant contact, such that the geometric shape navigable items for the traversed Web sites are simultaneously displayable with varying sizes of geometric shape navigable items each corresponding to a single Web site to thereby indicate significance of contact with the respective traversed Web site.

19. The method as recited in claim 18, wherein the act of determining that the Web browser has contacted a plurality of Web sites comprises:

an act of receiving information from an activity repository indicative of:
a Web browser sending an HTTP request message to a Web site; and
a Web browser receiving a corresponding HTTP reply message from the Web site.

20. The method as recited in claim 18, wherein the act of receiving key words for each of the plurality of Web sites comprises an act of receiving key words that were stripped from content at each of the plurality of Web sites.

21. The method as recited in claim 18, wherein the act of receiving key words for each of the plurality of Web sites comprises an act of receiving key words that were entered at a search bar.

22. The method as recited in claim 18, wherein the act of comparing the received key words for each of the plurality of Websites to terms in a hierarchical category database comprises an act of comparing the received key words to terms in a Dewey Decimal System database.

23. The method as recited in claim 18, wherein the act of comparing the received key words for each of the plurality of Websites to terms in a hierarchical category database comprises an act of comparing the received key words to terms in a United States Library of Congress Classification System database.

24. The method as recited in claim 18, wherein the act of assigning each of the plurality of Web sites to a corresponding category included in the hierarchical category database comprises an act of assigning a Web site to a category of a Dewey Decimal System database based on received key words matching terms in the category.

25. The method as recited in claim 18, further comprising:
an act of identifying sub-categories within the assigned categories for each of the contacted Web sites wherein the act of visually displaying a categorized Web site map of the plurality of contacted Web sites comprises the act of visually displaying sub-category indicators within the boundaries of each category geometric shape, each sub-category indicator representing an identified sub-category of an assigned category; and
wherein visually displaying a geometric shape navigable item contained within the boundaries of the category geometric for the contacted Web site comprises grouping the geometric navigable item for the contacted Web site along with geometric navigable items for other contacted Web sites identified in the same sub-category in proximity to the sub-category indicator for the identified sub-category.

26. A computer program product for use at a computer system including a Web browser, the computer program product for implementing a method for presenting a map of contacted Web sites, the computer program product comprising one or more computer-readable storage media having stored thereon computer-executable instructions that, when executed at a processor, cause the computer system to perform the method including the following:

determine that the Web browser has contacted a plurality of Web sites;

receive key words for each of the plurality of contacted Web sites;

compare the received key words for each of the plurality of contacted Websites to terms in a hierarchical category database;

assign each of the plurality of contacted Web sites to a category included in the hierarchical category database based on the results of the comparisons;

visual displaying a categorized Web site map of the plurality of contacted Web sites, the Web site map including:

for each of the assigned categories, visually display a category geometric shape representing the assigned category, the category geometric shape indicating a boundary for Web sites assigned to the assigned category relative to the category geometric shapes for other assigned categories;

for each of the contacted Web sites, visually display a geometric shape navigable item for the contacted Web site contained within the boundaries of the category geometric shape representing the assigned category assigned to the contacted Web site, each geometric shape navigable item being specific to a single one of the contacted Web sites, and each geometric shape navigable item containing representative content from the contacted Web site, the representative content being actual content from the contacted Web site, wherein the size of each geometric shape navigable item varies based on significance of contact with the contacted Web site so as to visually represent the significance of the contact with the contacted Web site including increased size of geometric shape navigable items to indicate traversed Web sites having more significant contact and reduced size of geometric shape navigable items to indicate traversed Web sites having less significant contact, such that the geometric shape navigable items for the traversed Web sites are simultaneously displayable with varying sizes of geometric shape navigable items each corresponding to a single Web site to thereby indicate significance of contact with the respective traversed Web site.

* * * * *